(12) United States Patent
Will et al.

(10) Patent No.: US 7,632,910 B2
(45) Date of Patent: Dec. 15, 2009

(54) POLYSILOXANE AND TEXTILE AUXILIARY CONTAINING A POLYSILOXANE

(75) Inventors: Peter Will, Gomaringen (DE); Matthias Koch, Filderstadt (DE); Friedhelm Nickel, Hellwege (DE)

(73) Assignee: CHT R. Beitlich GmbH, Tuebingen (DE)

( * ) Notice: Subject to any disclaimer, the term of this patent is extended or adjusted under 35 U.S.C. 154(b) by 31 days.

(21) Appl. No.: 10/479,633

(22) PCT Filed: Apr. 4, 2003

(86) PCT No.: PCT/EP03/03534

§ 371 (c)(1), (2), (4) Date: Jun. 30, 2004

(87) PCT Pub. No.: WO03/085015

PCT Pub. Date: Oct. 16, 2003

(65) Prior Publication Data

US 2004/0219371 A1 Nov. 4, 2004

(30) Foreign Application Priority Data

Apr. 4, 2002 (DE) ................. 102 14 982

(51) Int. Cl.
*B32B 27/12* (2006.01)
*C08G 77/04* (2006.01)
(52) U.S. Cl. ............................ 528/37; 528/28; 528/29; 528/35; 428/365; 428/447
(58) Field of Classification Search ................... 528/28, 528/29, 35
See application file for complete search history.

(56) References Cited

U.S. PATENT DOCUMENTS

| 4,702,857 A | * | 10/1987 | Gosselink | ................... | 510/299 |
| 5,217,642 A | * | 6/1993 | Kud et al. | ................... | 510/475 |
| 5,620,788 A | * | 4/1997 | Garavaglia et al. | ........... | 442/118 |
| 6,538,052 B2 | * | 3/2003 | Scherzer et al. | .............. | 523/456 |

OTHER PUBLICATIONS

Derwent Abstract of JP 06228813 A, Preparation of polyester Fibre, Aug. 16, 1994.*
Derwent Abstract of JP10053959 A, Oily agent for elastic fibre—comprises a polysiloxane having at least one functional group, Feb. 24, 1998.*
Derwent Abstract of JP 2000110077 A, Liquid finishing agent for textile products—comprise denatures silicone, Apr. 18, 2000.*
Derwent Abstract of JP10053962 A, Oily agentfor elastic fibre—comprises a polysiloxane modified by epoxy-group containing polyoxyethylene, Feb. 24, 1998.*

* cited by examiner

*Primary Examiner*—James Seidleck
*Assistant Examiner*—John J Figueroa
(74) *Attorney, Agent, or Firm*—Kriegsman & Kriegsman

(57) ABSTRACT

The present invention relates to a polysiloxane of the general formula (I)

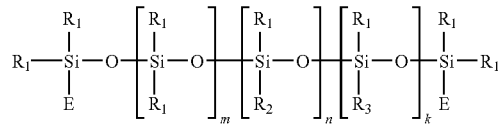

having at least one epoxidic radical and at least one quaternary nitrogen atom and also a textile auxiliary which comprises at least one polysiloxane according to the present invention. The polysiloxane is capable of crosslinking with or on the fiber.

16 Claims, No Drawings

POLYSILOXANE AND TEXTILE AUXILIARY CONTAINING A POLYSILOXANE

The present invention relates to a polysiloxane and also to a textile auxiliary having a polysiloxane.

EP 1 000 959 A2 describes polyether quat functional polysiloxanes which are used in compositions for improving the surface properties of fabrics and fibers. Polyether quat functional polysiloxanes are poly-siloxanes in which the silicon atoms bear at least one polyether radical and at least one radical having a quaternary nitrogen atom, the counter ion being an anion of an organic or inorganic acid. Compounds of this type are useful as textile auxiliaries for substrates composed for example of cotton, polyester or else leather that endow the material with a good softness and a lower tendency to yellow. What is particularly desired here but has so far only been achieved to an unsatisfactory extent is good durability on the fiber and good handlability, i.e., a viscosity which is not too high.

DE 40 23 247 C1 discloses oxyalkylenyl-modified epoxypolysiloxanes where the Si—O— backbone has attached to it, for example, short- or long-chain alkyl radicals, at least one epoxy radical attached via Si—C— bonds to silicon atoms of the polysiloxane and at least one oxyalkylene radical. These curable epoxypolysiloxanes are used as photoinitiator-curable coatings.

It is an object of the present invention to provide novel substances which are useful as textile auxiliaries for finishing fibers and fabrics and exhibit improved durability and better handlability.

This object is achieved by a compound having the features of claim 1. The present invention accordingly provides that the polysiloxanes, as well as at least one quaternary nitrogen atom, have at least one epoxy radical. The epoxy radical enables the substance to be crosslinked on the fiber. This provides improved durability in that the substance can no longer be washed off the fiber. It has further been determined that, surprisingly, the thus finished materials exhibit very good softness and a particularly pleasant wear physiology. The substances of the present invention are useful for all natural and manufactured fibers which are capable of reacting with epoxides, i.e., which have OH and/or NH radicals for example. The side chains of the radicals $R_2$ and $R_3$ ensure a certain degree of steric hindrance effective to reduce the viscosity of the compounds of the present invention, so that handling is improved.

The present patent application further provides a textile auxiliary containing at least one polysiloxane of the present invention. Since this substance can no longer be washed off the fiber, the textile auxiliary exhibits particularly pronounced durability. It has further been determined that, surprisingly, the thus finished materials exhibit very good softness and a particularly pleasant wear physiology.

The present invention finally also provides a fiber or a fabric, the latter having been finished or treated with such a textile auxiliary.

Advantageous refinements will be apparent from the subsidiary claims. More particularly, the fraction of alkyl radicals having 2 to 30 carbon atoms can be more than 10 mol when measured against the total number of radicals.

The polysiloxanes of the present invention are preferably used in the form of aqueous emulsions. A suitable process for preparing finely divided polydiorganosiloxane emulsions is for example known from U.S. Pat. No. 5,302,657. There, the emulsion is prepared with a polydiorganosiloxane-soluble emulsifier in two steps, the first step providing a concentrate which is diluted with water in the second step. The emulsifiers used may be any emulsifiers which are usable for preparing organofunctional polysiloxane emulsions.

Useful nonionic emulsifiers are in particular alkyl polyglycol ethers, preferably those having 4 to 40 ethylene oxide units and/or alkyl radicals of 8 to 20 carbon atoms; alkylaryl polyglycol ethers, preferably those having 4 to 40 ethylene oxide units and/or 8 to 20 carbon atoms in the alkyl radicals; ethylene oxide-propylene oxide block copolymers, preferably those having 4 to 40 ethylene oxide and/or propylene oxide units; saturated and unsaturated fatty acids having 6 to 24 carbon atoms; natural materials and their derivatives such as lecithin, lanolin, saponins, cellulose; cellulose alkyl ethers and carboxyalkyl-celluloses whose alkyl groups each possess up to 4 carbon atoms; linear polydiorganosiloxanes containing polar groups, especially polyether groups; saturated and unsaturated alkoxylated fatty amines having 8 to 24 carbon atoms.

Useful cationic emulsifiers are for example salts of primary, secondary and tertiary fatty amines having 8 to 24 carbon atoms, especially with acetic acid, hydrochloric acid and phosphoric acids; quaternary alkylbenzeneammonium salts, especially those whose alkyl group possesses 6 to 24 carbon atoms, especially the halides, sulfates, phosphates and acetates; alkylpyridinium, alkylimidazolium and alkoxyoxazolinium salts, especially those whose alkyl chain possesses up to 18 carbon atoms, specifically the halides, sulfates, phosphates and acetates.

Further useful emulsifiers can be selected from the group consisting of fatty acid polyglycol esters, polyethoxylated fatty acid glycerides and sorbitan esters, alkyl polyglycosides, fatty acid alkylolamides, alkyl ether carboxylic acids, alkylaryl ether carboxylic acids, ethoxylated quaternary ammonium salts, amine oxides, betaines, sulfobetaines and sulfosuccinates.

The aqueous emulsion may contain one or more inorganic and/or organic acids and/or anhydrides as a further component. Suitable are for example hydrochloric acid, sulfuric acid and phosphoric acid, but also formic acid, acetic acid, glycolic acid, aldonic acids such as for example gluconic acid, ascorbic acid or uronic acids such as for example glucuronic acid. Useful polybasic acids include for example oxalic acid, citric acid or aldaric acids such as glucaric or mucic acid. An example of an anhydride of an organic acid is acetic anhydride.

The aqueous emulsion may further contain, as a further component, a hydrotrope which may be selected for example from the group of the polyfunctional alcohols. It is thus possible to use dialcohols having 2 to 10, preferably 2 to 6, but especially 2 to 4 carbon atoms per molecule. Also highly suitable are their mono- and diethers and also the mono- and diesters of these dialcohols. Substances which are to be used with particular preference are for example 1,2-propylene glycol, dipropylene glycol and butyldiglycol. The preparations of the polysiloxanes of the present invention may also be combined with conventional finishing agents to achieve further textile-engineering effects. Suitable components here are polyethylene compounds, fatty acid condensation products and also other organosiloxanes.

A preferred composition contains 2% to 80% by weight of at least one polysiloxane of the present invention, 0% to 40% by weight of at least one emulsifier, 0% to 5% by weight of at least one inorganic and/or organic acid and/or of an acid anhydride, 0% to 40% by weight of at least one customary finishing agent, 0% to 20% by weight of at least one hydrotrope and also 0% to 98% by weight of water.

The examples which follow illustrate the present invention.

1. Preparation of Polysiloxanes of the Present Invention

The illustrative examples of the polysiloxanes of the present invention are hereinafter referred to as a quat, the three preceding numbers in each case designating the chain length, the number of $SiOMe_2$ units, the number of SiOMeH units and the number of terminal radicals starting from $SiOMe_2H$. As to the chemistry of the polysiloxanes and especially as to hydrosilylation, reference is made to Walter Noll, Chemie und Technologie der Silicone, Verlag Chemie Weinheim, $2^{nd}$ revised edition 1968, ISBN: 0125207506 and also to Bogdan Marciniec (ed.), Comprehensive Handbook of Hydrosylilation, pp. 11-18, Pergamon Press 1992. As to quaternization, reference is made to EP 1 000 959.

1. 30/2/2 Quat a) Synthesis of a precursor with 4 mol of allyl glycidyl ether (AGE)

A 500 ml four-neck flask equipped with stirrer, dropping funnel, thermometer and reflux condenser is charged under nitrogen with 21.91 g (0.192 mol) of AGE and, at 60° C., with 0.1 g of a platinum compound. This is followed by the dropwise addition of 89.38 g (0.048 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 3.66 g (0.06 mol) of acetic acid and 16.5 g (0.06 mol) of C16 amine is added dropwise at 80° C. in the course of about 30 min. The supplementary reaction time is 2 to 6 hours. The product is a clear, light yellow oil having a viscosity of 400 mPa×s.

b) Synthesis of a precursor with 3 mol of allyl glycidyl ether (AGE) and 1 mol of hexadecene A 500 ml four-neck flask equipped with stirrer, dropping funnel, thermometer and reflux condenser is charged under nitrogen with 16.44 g (0.144 mol) of AGE and 10.8 g (0.048 mol) of hexadecene and, at 60° C., with 0.1 g of a platinum compound. This is followed by the dropwise addition of 89.38 g (0.048 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 5.7 g (0.09 mol) of acetic acid and 17.0 g (0.06 mol) of C16 amine is added dropwise at 80° C. The supplementary reaction time is 2 to 6 hours. The product is a clear, light yellow oil having a viscosity of 500 mPa×s.

2. 60/2/2 Quat a) Synthesis of a precursor with 4 mol of AGE

A 500 ml four-neck flask equipped with stirrer, dropping funnel, thermometer and reflux condenser is charged under nitrogen with 21.91 g (0.192 mol) of AGE and, at 60° C., with 0.1 g of a platinum compound. This is followed by the dropwise addition of 225.56 g (0.048 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 2.4 g (0.04 mol) of acetic acid and 10.26 g (0.04 mol) of C16 amine is added dropwise at 80° C. in the course of about 30 min. The supplementary reaction time is 2 to 6 hours. The product is a clear, light yellow oil having a viscosity of 500 mPa×s.

3. 80/2/2 Quat a) Synthesis of a precursor with 4 mol of AGE

A 500 ml four-neck flask equipped with stirrer, dropping funnel, thermometer and reflux condenser is charged under nitrogen with 21.91 g (0.192 mol) of AGE and, at 60° C., with 0.1 g of a platinum compound. This is followed by the dropwise addition of 296.6 g (0.048 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 1.51 g (0.025 mol) of acetic acid and 5.4 g (0.025 mol) of C12 amine is added dropwise at 80° C. in the course of about 30 min. The supplementary reaction time is 2 to 6 hours. The product is a clear, light yellow oil having a viscosity of 1600 mPa×s.

Synthesis of Quat Compound

In another version, a 500 ml four-neck flask equipped with stirrer, dropping funnel, thermometer and reflux condenser is charged with 100 g of precursor. A mixture of 1.51 g (0.025 mol) of acetic acid and 6.82 g (0.025 mol) of C16 amine is added dropwise at 80° C. in the course of about 30 min. The supplementary reaction time is 2 to 6 hours. The product gives a clear, yellow oil having a viscosity of 2000 mPa×s.

b) Synthesis of a precursor with 3 mol of AGE and 1 mol of hexadecene

A 500 ml four-neck flask equipped with stirrer, dropping funnel, thermometer and reflux condenser is charged under nitrogen with 16.44 g (0.144 mol) of AGE and 10.8 g (0.048 mol) of hexadecene and, at 60° C., with 0.1 g of a platinum compound. This is followed by the dropwise addition of 296.6 g (0.048 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 1.23 g (0.025 mol) of acetic acid and 5.56 g (0.025 mol) of C16 amine is added dropwise at 80° C. in the course of about 30 min. The supplementary reaction time is 2 to 6 hours. The product is a clear, yellow oil having a viscosity of 1300 mPa×s.

c) Synthesis of a precursor with 3 mol of AGE and 1 mol of allyl polyether

A 500 ml four-neck flask equipped with stirrer, dropping funnel, thermometer and reflux condenser is charged under nitrogen with 4.12 g (0.036 mol) of AGE and 9.0 g (0.012 mol) of alkyl polyether and, at 60° C., with 0.1 g of a platinum compound. This is followed by the dropwise addition of 296.6 g (0.048 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 2.3 g (0.04 mol) of acetic acid and 8.27 g (0.04 mol) of C12 amine is added dropwise at 80° C. The supplementary reaction time is 2 to 6 hours. The product is a clear, yellow oil having a viscosity of 2000 mPa×s.

4. 80/0/2 quat (comparative example)
Synthesis of a Precursor

A 500 ml four-neck flask equipped with stirrer, dropping funnel, thermometer and reflux condenser is charged under nitrogen with 3.76 g (0.033 mol) of AGE and, at 60° C., with 0.1 g of a platinum compound. This is followed by the dropwise addition of 100.0 g (0.0165 mol) of hydrosiloxane and heating to 100° C. The reaction proceeds until all the hydrogen has reacted. The product is a clear, light yellow oil of low viscosity.

Synthesis of Quat Compound

A 500 ml four-neck flask equipped with stirrer, dropping funnel, thermometer and reflux condenser is charged with 100 g of precursor. A mixture of 1.51 g (0.025 mol) of acetic acid and 6.82 g (0.025 mol) of C16 amine is added dropwise at 80° C. in the course of about 30 min. The supplementary reaction time is 2 to 6 hours. The product is a clear, yellow oil having a viscosity of 12000 mPa×s II. Preparation of Textile Auxiliaries of the Present Invention EXAMPLES A to F 33 g of a polysiloxane from Examples I1-I4 are mixed with 3.5 g of isotridecanol ethoxylate having 8 EO, 1.5 g of quaternary cocoalkylamine ethoxylate, 4 g of butyldiglycol and 0.2 g of acetic acid (60%), and then 57.8 g of water are added with stirring. This gives transparent or milkily cloudy emulsions.

Table 1 summarizes the polysiloxanes used in the individual examples.

TABLE 1

| Example | Polysiloxane |
|---------|--------------|
| A | I1b |
| B | I2a |
| C | I3a |
| D | I3b |
| E | I3c |
| F | I4 (comparative example) |

III. Performance testing
a) Application Examples

To test the softness and also the hydrophilicity of the emulsions of the present invention, native fibers were finished using the following padding process:

A cotton fabric (125 g/m²) was padded with a liquor containing 20 g/l of the corresponding emulsion, squeezed off to a 70% wet pick-up and subsequently dried at 120° C. for three minutes.

b) Test Methods

The finished fabric was subjected to a hand evaluation and a hydrophilicity test as described hereinafter under 1. and 2. Subsequently, the fabrics were subjected to three washes as described under 3. and the test was repeated after the first and third washes. The results are summarized in Tables 2 and 3.

1. Hand Evaluation

A panel of epert judges assessed the anonymized hand samples of the fabrics finished with emulsions A to F by handling the samples. The test series included in each case an untreated fabric as a comparative sample. The result is a very soft, pleasant, silky and elegant hand for the finished textile substrate.

2. Testing of Hydrophilicity

Hydrophilicity is tested using the TEGEWA drop test (cf. Melliand 68, 1987; 581-583). To conduct the test, the finished fabric is horizontally stretched over a suitable tensioning device in such a way that the fabric does not come into contact with the surface underneath. A water droplet of 0.050 ml +/−10% is dripped onto the fabric from a height of 40 mm. As soon as the droplet impacts on the test material, a stopwatch is started. It is stopped when the droplet has completely penetrated into the fabric and the shine has disappeared.

3. Washing

The washes were carried out in a commercially available washing machine, Zanker Classic 8082, using the 40° C. wash cycle for coloreds and a commercially available universal laundry detergent, phosphate-free Persil. The machine was additionally loaded with one kilogram of polyester fabric as a ballast material. The specimens were subsequently dried overnight at room temperature.

TABLE 2

Evaluation of softness of textile auxiliaries from Examples A to F mentioned under II.

| Softness | A | B | C | D | E | F | untreated |
|----------|---|---|---|---|---|---|-----------|
| Prior to washing | ++ | +++ | +++ | +++ | ++ | ++ | − |
| After 1st wash | ++ | +++ | +++ | +++ | ++ | +/− | − |
| After 3rd wash | + | + | ++ | ++ | + | − | − |

TABLE 3

Evaluation of hydrophilicity of textile auxiliaries from Examples A to F mentioned under II.; the sink time is reported in seconds.

| Hydrophilicity | A | B | C | D | E | F | untreated |
|----------------|---|---|---|---|---|---|-----------|
| Prior to washing | 36 | 45 | 62 | 73 | 21 | 69 | 19 |
| After 1st wash | 19 | 23 | 48 | 52 | 12 | 13 | 7 |
| After 3rd wash | 8 | 11 | 35 | 23 | 8 | 5 | 5 |

The invention claimed is:

1. A polysiloxane of the general formula (I)

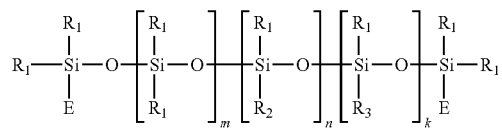

where m is an integer from 5-200,
n is an integer from 0-25,
k is an integer from 1-25,
$R_1$ is an aliphatic $C_1$ to $C_{30}$ radical or a phenyl radical, $R_2$ is an aliphatic $C_9$ to $C_{30}$ radical and/or a polyether radical of the general formula $(CH_2)_3O(C_2H_4O)_x(C_3H_6O)_yQ$, where x and y may be the same or different and are each an integer between 0 and 50 and Q is hydrogen or an alkyl radical of 1 to 4 carbon atoms, $R_3$ is an epoxidic radical, E is an MZ radical, $R_3$ or $R_2$, each molecule containing at least one epoxidic radical and one MZ radical, the epoxidic radical being selected from the group consisting of

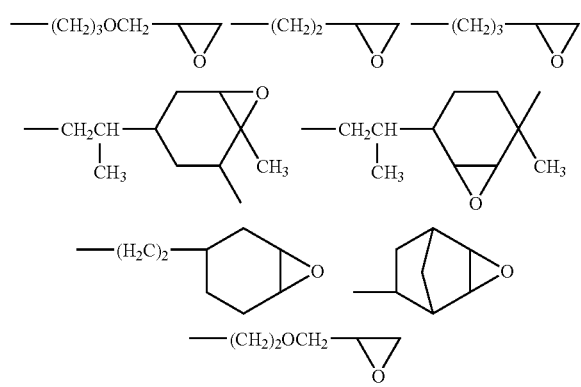

M being selected from the group consisting of

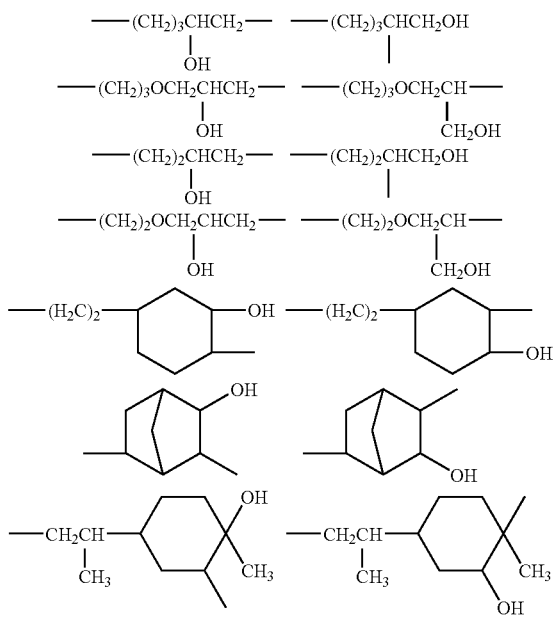

Z being selected from the group consisting of

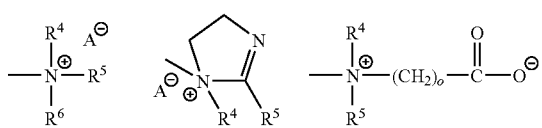

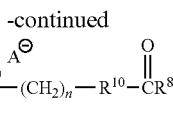

where the quaternary nitrogen atom of the Z radical is attached to the M radical via the carbon atom adjacent to the C—OH group in the M radical, $R^4$, $R^5$ and $R^6$ may be the same or different and may denote H, $C_1$ to $C_{22}$ alkyl, $C_1$ to $C_{22}$ alkenyl, which alkyl or alkylene radicals may contain hydroxyl groups, $R^8$ and $R^9$ may be the same or different and each has the same meaning as $R^4$, $R^5$ and $R^6$ or are fluorine-, chlorine- or bromine-substituted $C_1$ to $C_{10}$ alkyl radicals, $R^{10}$ is an —O— or an $NR^{11}$ radical where $R^{11}$=H, $C_1$ to $C_4$ alkyl or $C_1$ to $C_4$ hydroxyalkyl, o is an integer from 1 to 4, $A^\ominus$ is an organic or inorganic anion derived from a customary physiologically tolerable acid HX, where the epoxidic radical is selected from ether epoxies, where the M component of the MZ radical is selected from primary/secondary straight chain alcohols, and where the Z component of the MZ radical is selected from guaternary ammoniums.

2. A polysiloxane according to claim 1, characterized in that the fraction of $C_2$ to $C_{30}$ alkyl radicals is more than 10 mol % of the total number of radicals.

3. A polysiloxane according to either of the preceding claims, characterized in that $R_2$ is an aliphatic $C_{10}$ to $C_{20}$ radical.

4. A polysiloxane according to claim 1, characterized in that the polyether radical denotes the general formula $(CH_2)_3O(C_2H_4O)_x(C_3H_6O)_yQ$, where x and y may be the same or different and x is an integer between 8 and 15, y is an integer between 0 and 25 and Q is hydrogen or an alkyl radical of 1 to 4 carbon atoms.

5. A textile auxiliary characterized in that it contains at least one polysiloxane according to claim 1.

6. A textile auxiliary according to claim 5, characterized in that it is in the form of an aqueous emulsion.

7. A textile auxiliary according to claim 6, characterized in that it contains at least one nonionic and/or cationic emulsifier.

8. A textile auxiliary according to claim 7, characterized in that the nonionic emulsifier is selected from the group consisting of alkyl polyglycol ethers, preferably those having 4 to 40 ethylene oxide units and/or alkyl radicals of 8 to 20 carbon atoms; alkylaryl polyglycol ethers, preferably those having 4 to 40 ethylene oxide units and/or 8 to 20 carbon atoms in the alkyl radicals; ethylene oxide-propylene oxide block copolymers, preferably those having 4 to 40 ethylene oxide and/or propylene oxide units; saturated and unsaturated fatty acids having 6 to 24 carbon atoms; natural materials and their derivatives such as lecithin, lanolin, saponins, cellulose; cellulose alkyl ethers and carboxyalkylcelluloses whose alkyl groups each possess up to 4 carbon atoms; linear polydiorganosiloxanes containing polar groups, especially polyether groups; saturated and unsaturated alkoxylated fatty amines having 8 to 24 carbon atoms.

9. A textile auxiliary according to claim 7, characterized in that the cationic emulsifier is selected from the group consisting of salts of primary, secondary and tertiary fatty amines having 8 to 24 carbon atoms, especially with acetic acid, hydrochloric acid and phosphoric acids; quaternary alkylbenzeneanmonium salts, especially those whose alkyl group possesses 6 to 24 carbon atoms, especially the halides, sulfates, phosphates and acetates; alkylpyridinium, alkylimidazolium and alkoxyoxazolinium salts, especially those whose alkyl chain possesses up to 18 carbon atoms, specifically the halides, sulfates, phosphates and acetates.

10. A textile auxiliary according to any one of claims 5 to 9, characterized in that it contains one or more inorganic and/or organic acids and/or anhydrides.

11. A textile auxiliary according to claim 10, characterized in that the acids and anhydrides are selected from the group consisting of hydrochloric acid, sulfuric acid and phosphoric acid, formic acid, acetic acid, glycolic acid, aldonic acids such as for example gluconic acid, ascorbic acid, uronic acids such as for example glucuronic acid, oxalic acid, citric acid, aldaric acids such as glucaric or mucic acid and also acetic anhydride, respectively.

12. A textile auxiliary according to claim 5, characterized in that it contains at least one hydrotrope.

13. A textile auxiliary according to claim 12, characterized in that the hydrotrope is selected from the group of the polyfunctional alcohols, especially dialcohols having 2 to 10, preferably 2 to 6 and more preferably 2 to 4 carbon atoms per molecule, their mono- and diethers and also their mono- and diesters, preferably 1,2-propylene glycol, dipropylene glycol and butyldiglycol.

14. A textile auxiliary, characterized in that it contains 2% to 80% by weight of at least one polysiloxane according to claim 1, 0% to 40% by weight of at least one emulsifier, 0% to 5% by weight of at least one inorganic and/or organic acid and/or of an acid anhydride, 0% to 40% by weight of at least one customary finishing agent, 0% to 20% by weight of at least one hydrotrope, and also 0% to 98% by weight of water.

15. Fiber or fabric characterized in that the latter comprises at least one polysiloxane according to claim 1.

16. Fiber or fabric characterized in that the latter has been treated with a textile auxiliary according to claim 5.

* * * * *